United States Patent [19]

Brown et al.

[11] Patent Number: 4,995,644
[45] Date of Patent: Feb. 26, 1991

[54] LOAD BALANCED COOLANT FITTING

[75] Inventors: Donald G. Brown, Newbury Park; Gary T. Miyata, Simi Valley, both of Calif.

[73] Assignee: The United States of America as represented by the Secretary of the Army, Washington, D.C.

[21] Appl. No.: 401,193

[22] Filed: Aug. 28, 1989

[51] Int. Cl.⁵ .................................... F16L 53/00
[52] U.S. Cl. ......................... 285/41; 285/133.1; 285/190
[58] Field of Search ............ 285/133.1, 41, 190, 285/166, 226

[56] References Cited

U.S. PATENT DOCUMENTS

| | | | |
|---|---|---|---|
| 289,265 | 11/1883 | Hurly | 285/160 X |
| 773,106 | 10/1904 | Stier | 285/190 X |
| 777,306 | 12/1904 | Robinson | 285/166 X |
| 1,284,099 | 11/1918 | Harris | 285/166 |
| 1,603,916 | 10/1926 | Hundemer | 285/166 X |
| 2,467,370 | 4/1949 | Christensen | 285/166 X |
| 2,511,495 | 6/1950 | Crot | 285/190 X |
| 2,616,728 | 11/1952 | Pitt | 285/166 X |
| 3,105,708 | 10/1963 | Esty | 285/41 |
| 3,265,411 | 8/1966 | Monroe et al. | 285/190 X |
| 3,334,926 | 8/1967 | Faccou | 285/190 X |
| 3,594,019 | 7/1971 | Gotschall et al. | 285/190 X |
| 3,653,690 | 4/1972 | Treveiler et al. | 285/226 |
| 3,669,470 | 6/1972 | Deurloo | 285/166 X |
| 4,295,452 | 10/1981 | Lembke et al. | 285/226 X |
| 4,842,059 | 6/1989 | Tomek | 285/166 X |
| 4,850,616 | 7/1989 | Pava | 285/41 |

FOREIGN PATENT DOCUMENTS

| | | | |
|---|---|---|---|
| 2274857 | 1/1976 | France | 285/166 |
| 0211993 | 1/1941 | Switzerland | 285/166 |
| 0303471 | 5/1971 | U.S.S.R. | 285/166 |
| 1202527 | 8/1970 | United Kingdom | 285/166 |

*Primary Examiner*—Randolph A. Reese
*Assistant Examiner*—Carol I. Bordas
*Attorney, Agent, or Firm*—Freddie M. Bush; James T. Deaton

[57] ABSTRACT

A load balanced coolant fitting for allowing an inlet structure and an optic support structure to be mounted relative to each other to communicate coolant fluid from the inlet structure to the optic support structure in such a way as to minimize vibration and jitter caused by the flowing of a coolant to be imparted to the optic structure.

6 Claims, 1 Drawing Sheet

4,995,644

LOAD BALANCED COOLANT FITTING

DEDICATORY CLAUSE

The invention described herein was made in the course of or under a contract or subcontract thereunder with the Government and may be manufactured, used, and licensed by or for the Government for governmental purposes without the payment to us of any royalties thereon.

BACKGROUND OF THE INVENTION

In the past, coolant fittings on cooled high power optics have been a major source of mirror figure distortion loading and flow induced vibrations which cause poor laser performance in beam quality and power. Therefore, there is a need for a coolant fitting that overcomes these disadvantages.

Accordingly, it is an object of this invention to provide a coolant fitting for mounting between two structures to allow for slight misalignments of the structures and still have a sealable fitting and a fitting that is balanced from pressures exerted thereon by flow therethrough.

Another object of this invention is to provide a coolant fitting that has reduced flow induced vibration jitter forces.

Still another object of this invention is to provide a fitting that has internally balanced fluid turning loads and internally balanced momentum loads.

Still another object of this invention is to provide a coolant fitting that has minimized installation loads and loads due to misalignment.

A still further object of this invention is to provide a fitting that lends itself to an evacuation system that lends itself to safeguards against leakage in a high vacuum system and also minimizes distortion due to thermal loading.

Other objects and advantages of this invention will be obvious to those skilled in this art.

SUMMARY OF THE INVENTION

In accordance with this invention, a load balanced coolant fitting is provided that includes an elongated tubular member with a universal type sealing connection at opposite ends and with end members that seal against ends of the tube and being adjustable to allow for misalignment. The end members are secured together with a tube for allowing balanced loads at opposite ends of the end members and each of the end members having radial ports therethrough for allowing fluid to enter at one end and exit at the other end of the tubular member.

Figure 1:
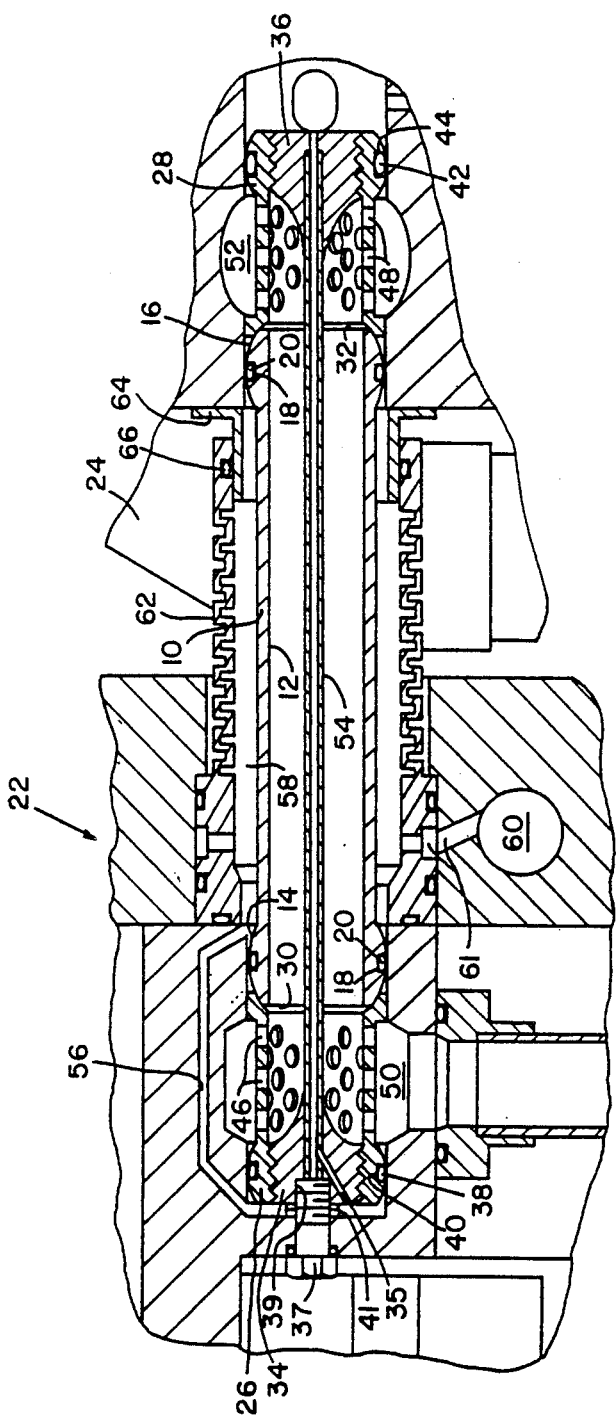
FIG. 1 is a sectional view illustrating a load balanced coolant fitting mounted relative to a fixed structure and a mirror structure.
Figure 2:
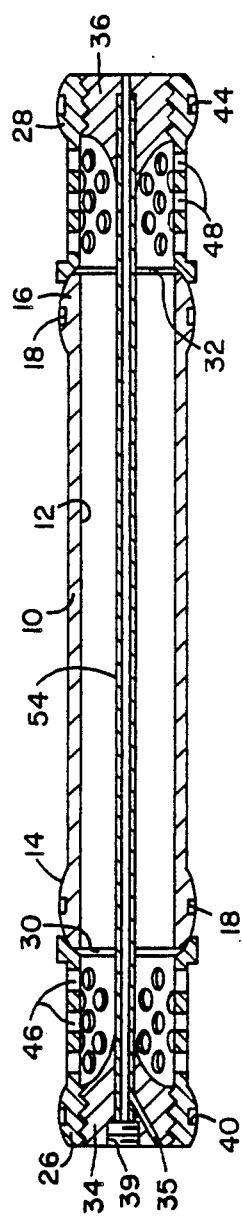
FIG. 2 is a sectional view illustrating the structure of the load balanced coolant fitting itself.

Referring now to the drawings, a load balanced coolant fitting in accordance with this invention includes an elongate hollow cylindrical member 10 with passage 12 there through and with part spherical surfaces 14 and 16 at opposite ends thereof. Each part spherical surface 14 and 16 has a groove 18 with an o-ring 20 therein. Part spherical surfaces 14 and 16 with o-rings 20 allow for angular motion centered at seals 20 to allow adjustment of cylindrical fitting 10 when mounted in inlet supply structure 22 and outlet supply mirror support structure 24. Inlet end member 26 and outlet end member 28 each have surfaces 30 and 32 that mate with part spherical surfaces 14 and 16. Inlet end member 26 has an inlet flow diverter 34 secured thereto in a conventional manner and outlet end member 28 has an outlet flow diverter 36 secured thereto in a conventional manner with each of the flow diverters being illustrated as having inlet and outlet end members 26 and 28 screwed thereon. Inlet end member 26 has o-ring 38 mounted in circumferential groove 40 and outlet end member 28 has o-ring 42 mounted in circumferential groove 44 with the o-ring seals 42 and 38 being adapted for sealing relative to the bores in members 22 and 24. Inlet end member 26 has a plurality of radial ports or holes 46 arranged circumferentially and outlet member 28 has a plurality of radial ports or holes 48 arranged circumferentially with ports 46 and 48 allowing for inlet fluid to enter through ports 46 and exit through ports 48 to communicate coolant fluid from inlet 50 to outlet 52. Flow diverters 34 and 36 are held in position by a center tube 54 that is secured in a conventional manner to flow diverters 34 and 36 such as by brazing. Tube 54 has a passage therethrough and diverter 34 has vent passage 35 to allow opposite ends of end members 26 and 28 to vent any leakage, that may occur. A passage 56 in support structure 22 communicates one end of inlet member 26 to a center cylindrical chamber 58 that surrounds a portion of cylindrical member 10, and outlet 60 communicates through passageway 61 with chamber 58 to drain off any leakage fluid that may leak from the fitting and cause any unnecessary loading or vibration relative to the load balanced coolant fitting. The load balanced coolant fitting is secured to inlet structure 22 by bolt 37 that is threaded into threaded opening 39 of flow diverter 34. Shims 41 are provided to obtain the desired spacing of the load balanced coolant fitting relative to inlet structure 22 and mirror mounting structure 24. Inlet 50 of structure 22 has a cylindrical member 62 mounted to seal relative thereto as illustrated and optic structure 24 has a cylindrical member 64 sealably secured thereto with members 62 and 64 being telescoped together with an o-ring seal 66 mounted for sealing between members 62 and 64. This telescoping structure as well as the specific structure of the bores within inlet structure 22 and optic support structure 24 allows the load balancing coolant fitting to adjust within limits relative to positioning of optic support structure 24 relative to inlet structure 22.

In operation, when it is desired to provide coolant to optic support structure 24, coolant is supplied through inlet 50, inlet ports or holes 46, bore 12 of member 10, outlet ports 48 and outlet 52 that directs the coolant fluid to the optics that are desired to be cooled. As will be appreciated, by having part spherical surfaces 14 and 16 with o-rings 20 as seals, this allows for angular motion centered at the seals and mounting of member 10 relative to the cylindrical bores of inlet member 22 and optic support structure 24. Because of these part spherical sealing arrangements, fitting 10 is allowed to self-align and thus compensate for manufacturing tolerances without introducing additional loads into the optics structure 24. This particular structure also allows for relative movement of optic structure 24 with respect to inlet support structure 22 without stressing optic support structure 24. This relative movement that is allowed prevents loads due to unequal thermal growth from being locked-up and transmitted to optic support structure 24. Inlet structure 26 and outlet structure 28 have a series of circumferential inlet holes 46 and outlet holes 48 for breaking up the flow into small streams that enter and exit the fitting radially. These small streams produce low amplitude vibrations and have less energy than full flow holes or openings. This particular structure thus reduces the amount of jitter or flow induced vibrations. By having the flow enter and exit radially, the momentum loads produced by flow are balanced against each other and have a net zero effect on the optic or optic structure 24. Flow diverters 34 and 36 at each end of the structure that are tied together by tube 54 keep the fluid turning loads captured within the overall fitting itself. These loads are reactions against each other and against the fitting outer cylindrical tube 10 and do not allow these loads to be passed into mirror support structure 24. It is also pointed out that threading of parts 34 and 36 relative to members 26 and 28 allows adjustability to compensate for manufacturing tolerances. This ensures that the loads will be captured and the fitting will not be overstressed.

It should also be noted that tube 54 with the passage there through acts as a leak path by which an evacuation system at outlet 60 can be incorporated to safeguard against leakage of the coolant into the vacuum environment. If the o-ring seals should fail, the evacuation system at outlet 60 will exit any leaking coolant leaking into and through passages 56, chamber 58 and to outlet 60. This allows any leaking coolant to be evacuated and allow continued testing of the optic for it's desired purpose without contaminating the vacuum environment.

We claim:

1. A coolant fitting for sealing between two structures comprising an elongated cylindrical member having a passage therethrough with sealing means for sealing at peripheral edges of part spherical circumferential surfaces at opposite ends, cylindrical inlet and outlet members mounted at opposite ends of the elongated cylindrical member and having surfaces that engage the part spherical surfaces of the elongated cylindrical member, and means securing the inlet and outlet members in engaging relationship to said part spherical surfaces of said elongated cylindrical member, and said inlet member having a plurality of circumferentially arranged radial inlet ports therethrough for providing an inlet to the passage of the elongated cylindrical member, and said outlet member having a plurality of circumferentially arranged radial outlet ports therethrough that communicate with the passage of the elongated cylindrical member for allowing fluid to exit there from.

2. A coolant fitting as set forth in claim 1, wherein said inlet member and said outlet member each have a flow diverter with the inlet flow diverter diverting flow toward the outlet diverter and the outlet diverter directing flow to said radial outlet ports of said outlet member.

3. A coolant fitting as set forth in claim 2, wherein said inlet member and said outlet member are secured to said cylindrical member by a tube that is secured to the inlet member and the outlet member to hold these members in engaging relationship to said cylindrical member.

4. A coolant fitting as set forth in claim 3, wherein said coolant fitting is mounted in an inlet support structure with inlet passage means for providing fluid to said radial inlet ports and an optic support structure having an outlet port with structure mounted relative to said coolant fitting for communicating fluid from said outlet ports of said outlet member to said outlet of said optic support structure.

5. A coolant fitting as set forth in claim 4, wherein said inlet support structure and said optic support structure have means connecting these members whereby they can be telescoped relative to each other in a sealing manner to allow the inlet support structure and the optic support structure to be adjusted relative to each other.

6. A coolant fitting as set forth in claim 5, wherein said inlet support structure and said optic support structure have means for allowing any fluid leaking past the cylindrical member and the inlet and outlet members to be evacuated through an outlet passage.

* * * * *